United States Patent
McEwan

(10) Patent No.: US 7,864,100 B2
(45) Date of Patent: Jan. 4, 2011

(54) SELF-REFERENCING RADAR PULSE DETECTOR

(75) Inventor: Thomas Edward McEwan, Las Vegas, NV (US)

(73) Assignee: McEwan Technologies, LLC, Las Vegas, NV (US)

( * ) Notice: Subject to any disclaimer, the term of this patent is extended or adjusted under 35 U.S.C. 154(b) by 690 days.

(21) Appl. No.: 11/891,873

(22) Filed: Aug. 13, 2007

(65) Prior Publication Data

US 2010/0073221 A1  Mar. 25, 2010

(51) Int. Cl.
*G01S 7/285* (2006.01)
*H04L 27/06* (2006.01)
*G01S 13/00* (2006.01)

(52) U.S. Cl. .................... 342/89; 342/21; 342/175; 375/316; 375/340

(58) Field of Classification Search .............. 342/13, 342/20, 89–103, 175, 195, 118, 128–145, 342/159–164, 21; 375/130–153, 316–352
See application file for complete search history.

(56) References Cited

U.S. PATENT DOCUMENTS

| | | | | |
|---|---|---|---|---|
| 2,646,561 A | * | 7/1953 | Emslie | 342/160 |
| 2,650,357 A | * | 8/1953 | Munster | 342/160 |
| 2,897,489 A | * | 7/1959 | De Motte et al. | 342/160 |
| 3,110,897 A | * | 11/1963 | Laurent | 342/131 |
| 3,157,875 A | * | 11/1964 | Matsukasa et al. | 342/160 |
| 3,307,185 A | * | 2/1967 | Mefford | 342/94 |
| 3,775,770 A | * | 11/1973 | Dillard et al. | 342/90 |
| 3,886,551 A | * | 5/1975 | Hempling | 342/132 |
| 4,005,416 A | * | 1/1977 | Tucker et al. | 342/90 |
| 4,053,888 A | * | 10/1977 | Robin et al. | 342/89 |
| 4,194,206 A | * | 3/1980 | Tsui et al. | 342/13 |
| 4,395,712 A | * | 7/1983 | O'Hare | 342/92 |
| 4,849,992 A | * | 7/1989 | Alderman et al. | 375/340 |
| 5,473,332 A | * | 12/1995 | James et al. | 342/159 |
| 6,137,438 A | | 10/2000 | McEwan | |
| 6,531,977 B2 | | 3/2003 | McEwan | |
| 6,738,436 B1 | * | 5/2004 | Harres | 375/343 |
| 6,771,209 B1 | | 8/2004 | Long | |

* cited by examiner

*Primary Examiner*—Bernarr E Gregory

(57) ABSTRACT

An automatic pulse detector compares a radar video pulse to a delayed and amplified version of itself. The radar video pulse serves as an amplitude reference for a comparator. A delayed and amplified version of the same pulse serves as the pulse to be detected. Time of detection is amplitude independent and is not degraded by flat-topped pulses. Pulse detection occurs at a fixed, fractional point on the leading edge of a pulse where noise has less temporal influence than at the top of a pulse. Unlike a time-of-peak detector, the self-referencing pulse detector is well-suited to detecting wide, flat-topped pulses produced by expanded-time, pulse-echo radars operating in relatively narrow ISM bands.

5 Claims, 2 Drawing Sheets

SELF-REFERENCING RADAR PULSE DETECTOR

BACKGROUND OF THE INVENTION

1. Field of the Invention

The present invention relates to radar detection circuits and more particularly to automatic pulse detection circuits. The invention can be used to detect pulses for wideband and UWB radar rangefinders, time domain reflectometers and radiolocation systems.

2. Description of Related Art

Radar echo pulses exhibit large amplitude variations, depending on target size, range and dielectric constant, and these variations produce range measurement errors when the pulses are detected with a fixed threshold detector. Echo amplitude variations also occur to a lesser extent with TDR-based tank level sensors, mainly being limited to dielectric constant variations of the liquid in the tank. However, accurate TDR-based tank level sensors require accurate, amplitude-independent pulse detectors.

Detectors with amplitude-tracking thresholds or other means to achieve amplitude independence are generally termed automatic pulse detectors and several automatic pulse detectors have been in existence for more than 30 years. U.S. Pat. No. 5,610,611, High Accuracy Material Level Sensor, to the present inventor, Thomas E. McEwan, describes the well-known constant fraction discriminator, or CFD, for use in a TDR-based tank level sensor. The CFD in the '611 patent uses a peak detector to determine the peak amplitude of repetitive equivalent-time pulses and sets a trigger point that is a fraction of the peak amplitude, such as the half-way point on the rise of the pulse (half-max detection). Unfortunately, the CFD exhibits latency errors caused by slow peak tracking when the pulses decrease in amplitude. Latency is a particular problem when the CFD is used in a TDR level sensor for sloshing liquids in a tank, such as an automotive gas tank. Another potential problem with the peak detector is it can erroneously lock-on to the strongest peak in a radar or TDR waveform, such as the main bang peak, unless the CFD is provided with analog gating. Another problem with the CFD is it can trigger on baseline noise when no echo pulses are present, so a threshold detector is needed to prevent false triggering. To overcome the limitations to a CFD, additional circuitry is often needed.

Another well-known automatic pulse detector is the time-of-peak (TOP) detector. The TOP detector differentiates pulses and triggers on the resulting zero axis crossings. To prevent false triggering on baseline noise, the desired pulses must be above a threshold before zero-axis detection is enabled. This standard detector is utilized in an application to TDR in U.S. Pat. No. 5,457,990, Method and Apparatus for Determining a Fluid Level in the Vicinity of a Transmission Line, to Oswald, 1995. However, the TOP detector can be less accurate than the CFD for the simple reason that a pulse peak is somewhat flat and has a low rate of change, making temporally accurate detection difficult. Small baseline perturbations, such as baseline ringing or radar clutter, can sum with the pulse and substantially displace the exact time-of-peak. In contrast, a CFD can detect at a fast slewing point during the pulse risetime where detection time is much less sensitive to baseline perturbations. A major limitation to a TOP detector is its inability to operate properly with flat-topped pulses—the pulse should have a sharp peak.

An amplitude-independent pulse detector is needed that (1) triggers on a high-slew point of a pulse like the CFD to avoid the inaccuracies of the TOP detector, (2) does not have the latency of the CFD, and (3) does not have the complexity of prior automatic detectors.

SUMMARY OF THE INVENTION

The invention is a self-referencing pulse detector that includes a method of detecting a radar video pulse (RVP), comprising: coupling a RVP to a first input of a two-input comparator, delaying the RVP to produce a delayed RVP; amplifying the delayed RVP to produce a delayed and amplified RVP; coupling the amplified and delayed RVP to a second input of the comparator; and, providing a detected output pulse from the comparator. The method of detecting a RVP can further comprise threshold detecting the RVP to produce a threshold pulse and gating the threshold pulse with the detected output pulse from the comparator to produce a thresholded detected output pulse.

The self-referencing radar pulse detector can also comprise: a detection comparator having a first and a second input for producing a detected radar pulse; an input line for coupling a radar video pulse (RVP) to the first input of the comparator; a delay circuit having an input coupled to the input line for producing a delayed RVP; and, an amplifier having an input coupled to the delay circuit and an output coupled to the second input of the comparator for producing a delayed and amplified RVP. The self-referencing radar pulse detector can further comprise: a threshold comparator having a first input coupled to the input line and a second input coupled to a voltage reference for producing a threshold pulse; and, a logic gate for gating the threshold pulse with the detection comparator output for producing a thresholded detected radar pulse. The self-referencing radar pulse detector can include a delay circuit that is one of a transmission line, an allpass network, or a lowpass filter.

Objects of the present invention are: (1) to provide an amplitude-independent automatic pulse detector that is accurate, simple, and inexpensive; (2) to provide an amplitude-independent automatic pulse detector with zero latency; and (3), to provide an amplitude independent automatic pulse detector that can operate equally well with impulses and with flat-topped pulses.

DETAILED DESCRIPTION OF THE INVENTION

A detailed description of the present invention is provided below with reference to the figures. While illustrative parameters and embodiments are given, other embodiments can be constructed with other parameters.

General Description

The present invention overcomes the limitations of prior radar video pulse (RVP) detectors by using the RVP itself as an automatic reference voltage. A delayed and amplified version of the RVP is then used as the pulse to be detected. Detection occurs whenever the delayed and amplified RVP exceeds the instantaneous amplitude of the RVP itself. Since the detection reference is set by the RVP itself, i.e., since it is self-referencing, the temporal location of the detection point is independent of the RVP amplitude.

The temporal location of the detection point is effectively on the leading edge of the RVP, generally in the middle of the risetime where the slew rate is greatest. Accordingly, sensitivity to noise is minimized, particularly when compared to a TOP detector. Furthermore, the self-referencing arrangement is free of latency and can adapt to pulse amplitude changes on each individual RVP.

Specific Description

Figure 1:
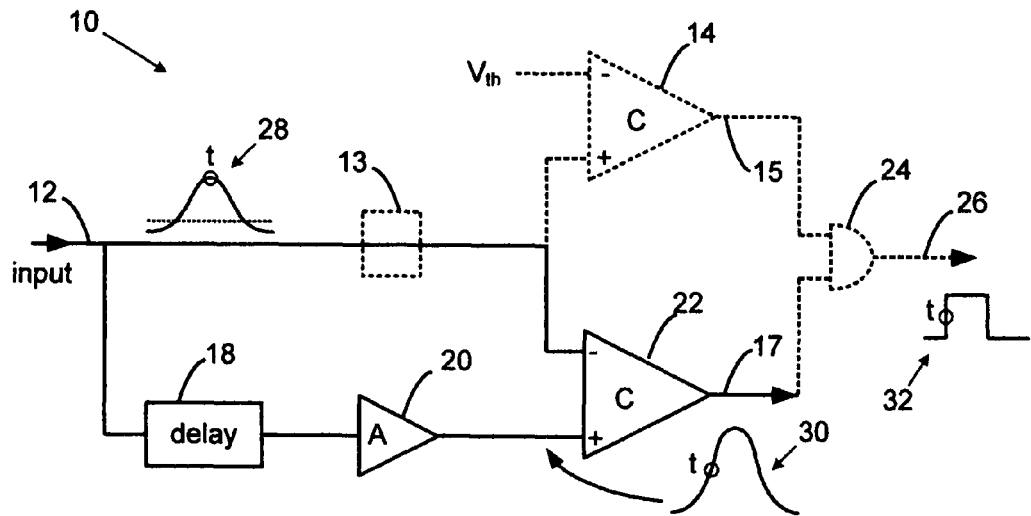
FIG. 1 is a diagram of a self-referencing pulse detector of the present invention.

Turning now to the drawings, FIG. 1 is a block diagram of a self-referencing radar pulse detector, generally 10. An exemplary radar video pulse (RVP) 28 is coupled to comparator 22 via input line 12. The RVP is also coupled to delay circuit 18, which is coupled to amplifier 20. Amplifier 20 produces a delayed and amplified version of the RVP, shown as pulse 30. When the instantaneous amplitude of pulse 30 exceeds the instantaneous amplitude of pulse 28, a detected output pulse is produced by comparator 22 on line 17. The exact detection time t is indicated by small circles on waveforms 28, 30 and 32. Time t is on the rapid rise portion of waveform 30, generally the lowest noise detection point.

Delay element 18 can be comprised of: (1) a classic LC (inductor-capacitor) transmission line; (2) a classic RC (resistor-capacitor) transmission line; (3) a conventional cable or microstrip transmission line; (4) an allpass network; (5) a lowpass filter, or (6) any other device (e.g., SAW) that can delay RVP 28. Delay 18 can be comprised of passive or active elements. In one embodiment, delay 18 is comprised of a third order active lowpass filter that also has gain. Thus delay element 18 and amplifier 20 can be unitized. The passband characteristics of an active lowpass can be optimized so delayed-and-amplified pulse 30 is not distorted by a recovery tail or by ringing; i.e., critical damping can be used. The more accurately pulse 30 resembles a delayed-and-amplified version of RVP pulse 28, the less chance there is of detection error when RVP 28 has a complex waveshape, as may be the case when radar clutter is present.

Figure 2:
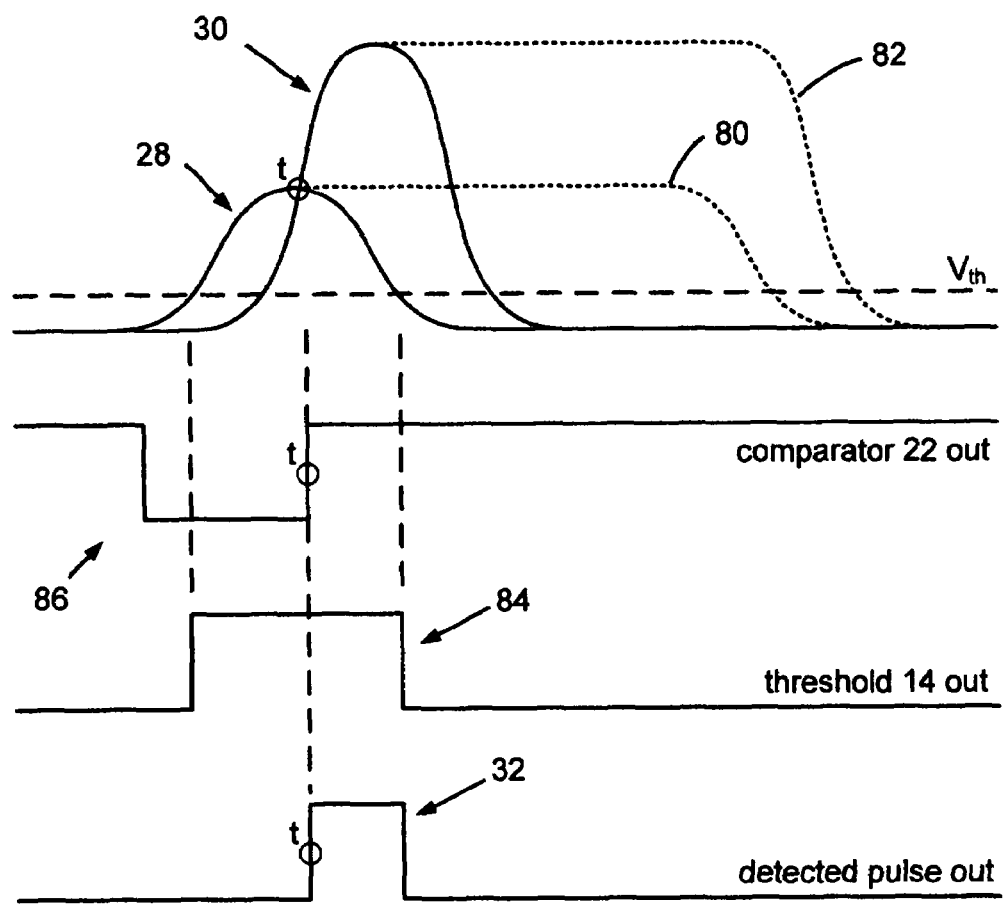
FIG. 2 is a timing diagram of the self-referencing pulse detector.

The amount of delay introduced by delay element 18 is somewhat of a design choice, with the delay shown in FIG. 2 being optimal for most applications. This amount of delay can be seen from FIG. 2 to be equal to about ½ of the risetime of pulse 28.

An optional threshold comparator 14 and logic gate 24 can be included to provide a threshold feature. Whenever the amplitude of RVP 28 exceeds a threshold level $V_{th}$, indicated by the dashed line on pulse 28, comparator 14 outputs a threshold pulse. The threshold pulse is gated with the detected pulse from comparator 22 to produce a gated detection pulse 32 on line 26. One benefit of this optional threshold feature is to prevent false triggers on noise when no RVP is present.

Amplifier 20 can be eliminated, with delay circuit 18 coupled directly to comparator 22, and an attenuator 13 can be inserted in series with line 12, before comparators 14 and 22 of FIG. 1, to produce a comparable result. The relative amplitudes of pulses 28 and 30 can be held in the same proportion by using either amplifier 20 or attenuator 13. Detection comparator 22 operates on the relative amplitudes of its input pulses. Consequently, the self-referencing detection function of the present invention occurs with either configuration. Whether one uses an attenuator or an amplifier is a design choice. In either case, the benefit of the invention is fully realized. For the sake of brevity, the amplifier configuration is described and claimed, but functionally and structurally, the amplifier and attenuator configurations are considered to be the same. In other words, if the pulse from delay circuit 18, or from amplifier 20, is larger than the reference pulse applied to the other input of comparator 22, it is considered to be amplified.

FIG. 2 is a timing diagram of a self-referencing radar pulse detector. RVP 28 is the input pulse and pulse 30 is the delayed and amplified pulse, as described with reference to FIG. 1. When pulse 30 intersects pulse 28, detection occurs at time t. One can easily visualize that time t does not vary with the amplitude of the RVP, since both pulses 28 and 30 vary in equal proportions. It is also evident by inspection that if the RVP became flat-topped and broadened in width, as indicated by dashed line 80, and consequently by dashed line 82, the intersection of the resulting waveforms would still occur at point t. Thus the detector is also independent of pulse width and can operate with wide pulses. Such wide pulses are common in radars that must operate within the FCC's designated ISM bands at, for example, 2.4 GHz, 5.8 GHz and 24 GHz. It is also evident from FIG. 2 that RVP 28 may have ringing after detection point t with no effect on the temporal location of point t. Thus, RVP 28 need not necessarily be a unipolar pulse. RVP 28 can comprise ½ cycle or more—up to many cycles—of a somewhat sinusoidal shaped signal. In such cases, the self-referencing radar pulse detector can automatically trigger on the first ½ cycle.

Comparator 22 outputs a digital output detection pulse 86 on line 17 whenever RVP 28 is more positive than delayed and amplified pulse 30. The output detection time is indicated at point t. Optional threshold comparator 14 outputs a threshold pulse 84 on line 15 whenever RVP 28 exceeds a reference voltage $V_{th}$. Threshold pulse 84 and comparator output pulse 86 are coupled to an optional AND gate, which produces a thresholded detection output pulse 32. Pulse 32 carries the detection timing point at time t. Pulse 32 can be used to trigger a latch, it can start or stop a range counter or control logic, or it can be used for other functions in processor 60.

Figure 3:
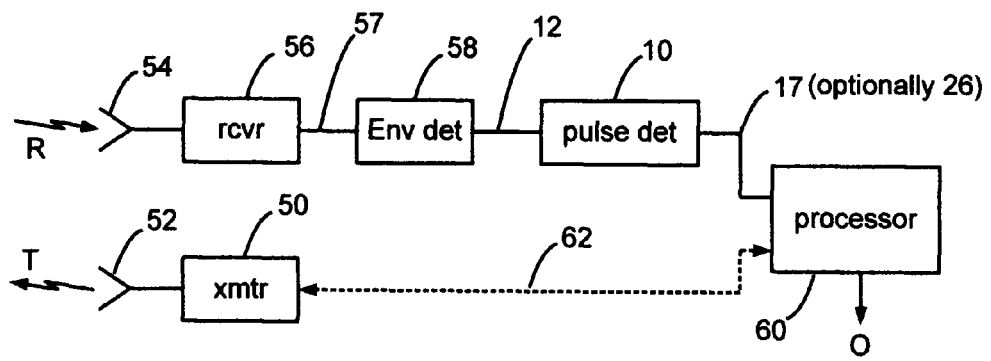
FIG. 3 is a diagram of a radar system incorporating the self-referencing pulse detector.

FIG. 3 is a block diagram of an exemplary radar transceiver including the present invention. Transmitter 50 transmits radar pulses into free space via antenna 52. Echoes are received via antenna 54 and received by receiver 56, which can produce raw video pulses on line 57 that often comprise one or more sinusoidal cycles. In such cases, the raw video pulses can be rectified and filtered by envelope detector 58 to produce a substantially unipolar radar video pulse (RVP) 28. Some radars can produce an unipolar RVP without the envelope detector. For example, some impulse radars can produce such pulses, time domain reflectometers (TDR) can produce unipolar pulses, and radars having a power sensitive, as opposed to a voltage sensitive, detector, can produce unipolar pulses. Pulse detector 10 and lines 12 and 17 are as described with reference to FIG. 1. Optionally, threshold comparator 14 and gate 24 may be included, in which case the output from element 10 will be on line 26. Processor 60 receives detected radar pulses and can produce a range output signal, or other processed signal, at port O, often in relation to timing signals to or from transmitter 50 on line 62.

An exemplary radar for use with the present invention can be a sampling type, expanded time radar such as that described in U.S. Pat. No. 6,137,438, "Precision Short Range Pulse-Echo Systems with Automatic Pulse Detectors," by the present inventor Thomas E. McEwan. RVP 28 can have a duration of about 1-millisecond after time-expansion and an amplitude of about 1-volt. Amplifier 20 can be a TLV-272 by Texas Instruments, Inc., and comparators 14 and 22 can be type LM-339 by Fairchild, Inc. One embodiment of the self-referencing radar pulse detector using these components in an expanded time radar exhibits less than an equivalent of 5 ps in detection variation over a 10:1 amplitude variation and over −55 to +65° C. temperature range, when RVP 28 is equivalently 1.5 ns wide in realtime, after backing out a time expansion factor of about 650,000.

Herein, the term "radar" can refer to a free-space radar that propagates pulses through air or a dielectric medium, e.g., a tank gauging radar. Radar can also mean a conducted or guided wave radar (GWR), such as a tank gauging radar or an "electronic dipstick." Radar can also mean a bistatic radiolocation radar for a radar-tracked writing pen or other object locator. In a GWR, antennas 52 and 54 of the exemplary radar of FIG. 3 can be replaced with a single GWR pulse launcher as is well-known in the art. The free-space radar of FIG. 3 can also be implemented using a single antenna for transit and receive as is well-known in the art.

The specific comparators and their input polarities, the specific logic gates and radar architectures given in this disclosure are examples. One skilled in the art can readily create other configurations as a design choice. Changes and modifications in the specifically described embodiments can be carried out without departing from the scope of the invention which is intended to be limited only by the scope of the appended claims.

What is claimed is:

1. A method of detecting a radar video pulse (RVP), comprising:
   coupling a RVP to a first input of an amplitude comparator;
   delaying the RVP to produce a delayed RVP;
   amplifying the delayed RVP to produce a delayed and amplified RVP;
   coupling the amplified and delayed RVP to a second input of the amplitude comparator; and,
   providing a detected output pulse from the amplitude comparator.

2. The method of detecting a RVP of claim 1 further comprising:
   threshold detecting the RVP to produce a threshold pulse; and
   gating the threshold pulse with the detected output pulse from the amplitude comparator to produce a thresholded detected output pulse.

3. A self-referencing radar pulse detector, comprising:
   a detection amplitude comparator having a first and a second input for producing a detected radar pulse;
   an input line for coupling a radar video pulse (RVP) to the first input of the amplitude comparator;
   a delay circuit having an input coupled to the input line for producing a delayed RVP; and,
   an amplifier having an input coupled to the delay circuit and an output coupled to the second input of the amplitude comparator for producing a delayed and amplified RVP.

4. The self-referencing radar pulse detector of claim 3 further comprising:
   a threshold amplitude comparator having a first input coupled to the input line and a second input coupled to a voltage reference for producing a threshold pulse; and,
   a logic gate for gating the threshold pulse with the detected radar pulse for producing a thresholded detected radar pulse.

5. The self-referencing radar pulse detector of claim 3 wherein the delay circuit is one of a transmission line, an allpass network, or a lowpass filter.

* * * * *